Figure 1:
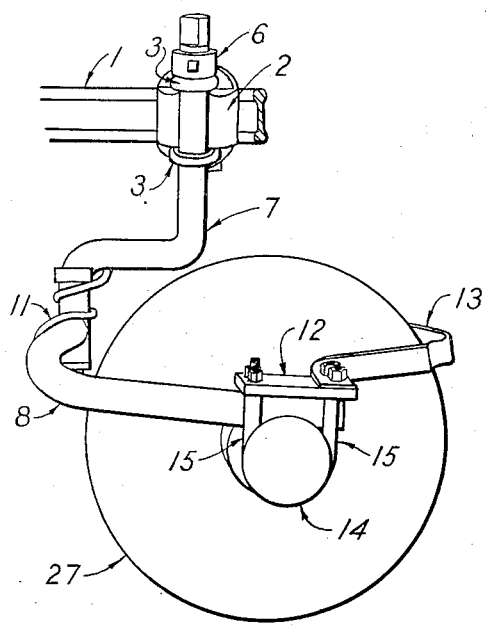
Figure 2:
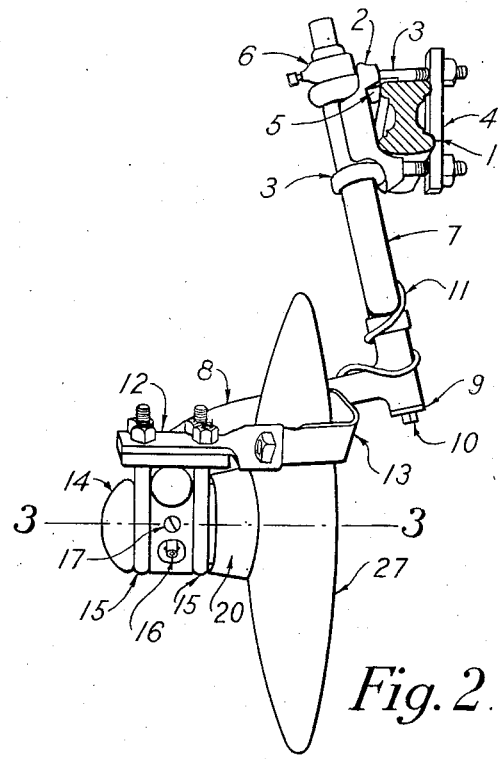
Figure 3:
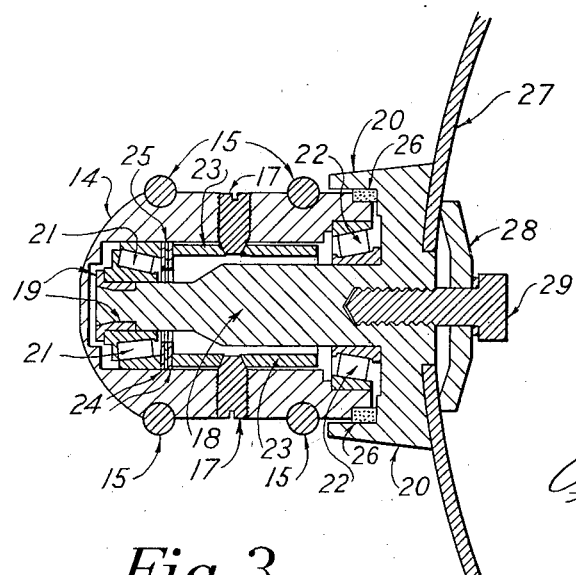

June 4, 1935.  A. H. GLAVES  2,003,831
SELF ALIGNING DISK JOINTER
Filed Jan. 24, 1935

Inventor
Archie H. Glaves
per
*[signature]*
Attorney

Patented June 4, 1935

2,003,831

UNITED STATES PATENT OFFICE 2,003,831

SELF-ALIGNING DISK JOINTER

Archie H. Glaves, Toledo, Ohio, assignor to Henry A. Wallace, Secretary of Agriculture of the United States of America Application January 24, 1935, Serial No. 3,337

2 Claims. (Cl. 97—217)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

This invention relates to improvements in attachments especially intended for severing and turning the edge of the furrow slice nearest the unplowed land, just ahead of the mold-board of a plow.

The complete coverage of all trash in plowing land is a method employed for the control of certain insect pests. Effective control by this method requires that trash capable of harboring the pests shall be covered with a sufficient depth of soil to insure that none of the material so covered will be brought to the surface in subsequent tillage operations.

In plowing, a strip of soil is sheared loose from the land, twisted, rolled over, and deposited in an inverted position by the moldboard of the plow. If no device is used on the plow for severing and turning the edge of the furrow slice in front of the moldboard, bulky trash will not be completely covered as portions will protrude between adjacent inverted furrow slices.

In the past various types of plow attachments for severing the edge of the furrow slice and aiding in turning under vegetation at its edge have been manufactured. The most common types, a combination of two attachments, a coulter and a jointer, have been used. I have found, however, that these attachments are difficult to adjust and in certain soil types may interfere with the operation of the plow by causing non-scouring of the plow bottom or by restricting the clearance of the plow and reducing its capacity to pass trash through without clogging.

Disk jointers have also been used for severing and turning the edge of the furrow slice. Former jointers of this type have been so designed that they are set with a fixed minimum angle of operation. Because of this inflexible adjustment side thrust of the soil on the disk may be transmitted to the plow and cause the plow to run out of alignment or have objectionable side draft. Also because of this rigid adjustment it must be accurately made and it is very difficult to secure the proper adjustment. Such disk jointers thus have no means provided for dynamic stability without lateral rigidity which is provided in my invention and which is an essential of it.

The objectives, therefore, of my invention are:

First, to provide a dependable plow attachment which will perform the intended functions of a jointer and coulter to insure the complete plowing under of vegetable growth on the soil. The concave disk which I have provided severs and aids in turning the edge of the furrow slice nearest the unplowed land just ahead of the mold-board of a plow.

Second, to provide a dependable self-aligning disk jointer. The disk jointer which I have provided is mounted on an offset shank and swivel arm in such a manner as to operate in dynamic stability without lateral rigidity.

Third, to provide a self-aligning disk jointer which will not be broken, or subjected to undue strain, when the cutting disk strikes a root, stone or other solid object. The position of an offset shank and swivel arm which I have provided permits the disk to swing to the side and upward when the disk strikes such an object.

Fourth, to provide a self-aligning disk jointer of such simple design and construction as to be economically manufactured.

I attain these objectives by means of such structure and relative arrangement of parts as are illustrated in the accompanying drawing in which:

Figure I is a side view;

Figure II is a rear view; and,

Figure III is a horizontal section on the line 3—3 of Figure II.

Similar numerals refer to similar parts throughout the several views.

By referring to the drawing, it will be seen that plow beam 1 has mounted thereon a bracket 2, comprising two eyebolts 3, a keeper bar 4, a shim 5, and a set collar 6. Offset shank 7, is adjustably affixed in a tilted position by bracket 2.

Mounted on the lower end of offset shank 7 is a swivel arm 8 held by washer 9 and capscrew 10. Stop 11 is detachably mounted on shank 7. Plate 12 is rigidly attached to arm 8. Scraper 13 is mounted on plate 12. Hub 14 is adjustably attached to plate 12 by means of U bolts 15 and provided with grease fitting 16 and set screws 17.

Referring to Figure III, it will be seen that the hub 14 retains a tapered axle 18 with a beveled concentric groove fitted with a beveled flanged expandible spindle keeper 19 at one end and a recessed flange fitting 20 for hub 14 at its opposite end. Roller bearing 21 held by expandible keeper 19 and hub 14 supports the tapered end of the axle 18. Roller bearing 22 held by axle 18 and hub 14 supports the opposite end of axle 18.

Washers 24, and shim 25 are held in position by sleeve 23. Sleeve 23 is provided with countersunk recesses for set screws 17 which hold axle 18 in hub 14. Bearings 21 and 22 are lubricated through the grease fitting 16 in hub 14. Felt washer 26 is fitted to hub 14 for excluding dust from and retaining lubricant in hub 14.

Disk 27 is rigidly attached to axle 18 by means of washer 28 and cap screw 29.

As the plow moves forward through the soil disk 27 revolves, severing and turning the edge of the furrow slice as it is being sheared from the unplowed ground and upturned by the moldboard of the plow. The disk 27, due to the position of the shank 7 and swivel arm 8, is held in dynamic equilibrium without lateral rigidity by the soil with the forces acting about the axis on which the arm swings. Disk 27, is so positioned that the plane of its cutting edge, is angularly offset from the plane of shank 7, where it forms the axis of swivel arm 8. The stop 11 is provided to prevent arm 8 from swinging too far from its working position when the plow bottom is out of the ground.

The construction and arrangement of the parts is such that a wide range of adjustments of my jointer is afforded.

For adjusting the lateral working range of disk 27, eyebolts 3 are loosened, offset shank 7 is turned, by suitable means not shown, thereby swinging the disk to the right or left, as desired. Set collar 6 is provided to prevent shank 7 from sliding down out of eyebolts 3 when loosened for adjustment.

The depth of cut of disk 27 is adjusted by loosening eyebolts 3 and set collar 6 and sliding shank 7 up or down, as desired.

The angle of disk 27 with the vertical is adjusted by means of U bolts 15. By tightening one U bolt and loosening the other, hub 14 is turned about swivel arm 8, thereby tilting disk 27.

Although the invention has been described with considerable particularity as to detail, it will, of course, be understood that the arrangements shown can be modified considerably to meet local conditions or requirements without departing from the spirit of my invention.

Having thus described my invention, what I claim for Letters Patent is:

1. The combination of a plow beam, a jointer shank having an intermediate portion normally disposed horizontally and having vertical terminal portions, the rear terminal portion extending upwardly and the front terminal portion extending downwardly, means for adjustably, securely affixing the rear terminal portion to the side of the plow beam, a swivel arm normally disposed horizontally and fitted upon the front depending terminal of the jointer shank, a plate rigidly attached to the free end of the swivel arm, a hub detachably secured to said plate, an axle retained by said hub, and a concaved disk rigidly mounted on the axle, and so positioned that its cutting edge is angularly offset from the front terminal portion of said shank.

2. The combination of a plow beam, a jointer shank having an intermediate portion normally disposed horizontally and having vertical terminal portions, the rear terminal portion extending upwardly and the front terminal portion extending downwardly, means for adjustably, securely affixing angularly the rear terminal portion to the side of the plow beam, a swivel arm normally disposed horizontally and fitted upon the front depending terminal of the jointer shank, a plate rigidly attached to the free end of the swivel arm, a hub detachably secured to said plate, an axle retained by said hub, and a concaved disk rigidly mounted on the axle, and so positioned that its cutting edge is angularly offset from the front terminal portion of said shank.

ARCHIE H. GLAVES.